(12) United States Patent
Favero (10) Patent No.: US 11,718,366 B2
(45) Date of Patent: Aug. 8, 2023

(54) PEDAL FOR BICYCLES

(71) Applicant: FAVERO ELECTRONICS S.R.L., Arcade (IT)

(72) Inventor: Gino Favero, Arcade (IT)

(73) Assignee: FAVERO ELECTRONICS S.R.L., Arcade (IT)

( * ) Notice: Subject to any disclaimer, the term of this patent is extended or adjusted under 35 U.S.C. 154(b) by 0 days.

(21) Appl. No.: 17/622,139

(22) PCT Filed: Aug. 12, 2020

(86) PCT No.: PCT/IB2020/057583
§ 371 (c)(1),
(2) Date: Dec. 22, 2021

(87) PCT Pub. No.: WO2021/028845
PCT Pub. Date: Feb. 18, 2021

(65) Prior Publication Data
US 2022/0411012 A1      Dec. 29, 2022

(30) Foreign Application Priority Data
Aug. 12, 2019   (IT) .................. 102019000014676

(51) Int. Cl.
*B62J 45/411*   (2020.01)
*B62M 3/08*   (2006.01)
*B62M 3/16*   (2006.01)

(52) U.S. Cl.
CPC ............. *B62M 3/08* (2013.01); *B62J 45/411* (2020.02); *B62M 3/16* (2013.01)

(58) Field of Classification Search
CPC .......... B62M 3/08; B62M 3/16; B62J 45/411
See application file for complete search history.

(56) References Cited

U.S. PATENT DOCUMENTS 11,001,327 B1 *   5/2021   Santurbane ............ B62J 45/414
2010/0024590 A1   2/2010   O'Neill et al.
(Continued)

FOREIGN PATENT DOCUMENTS

CN        203497117        3/2014
CN        106476971        3/2017
(Continued)

OTHER PUBLICATIONS

Machine translation of FR 3078158 A1, Ulrich, Aug. 23, 2019 (Year: 2019).*
(Continued)

*Primary Examiner* — Vinh Luong
(74) *Attorney, Agent, or Firm* — McCracken & Gillen LLC (57) ABSTRACT

A pedal for bicycles comprising: a pedal-pin which extends along a reference axis, a pedal-body that comprises a hub coupled in a freely rotatable manner on the pedal-pin, an electronic measurement circuit firmly coupled to the pedal-pin to provide electrical measurement signals indicative of the deformation of the pedal-pin, a mechanical clamping member comprising: a first clamping element which is arranged on the pedal-pin to rotate around the reference axis and is positioned in abutment against a shoulder of the pedal-pin in order to be axially clamped along said axis), and a second clamping element that firmly couples the hub to the first clamping element so that the hub is axially clamped to the pedal-pin.

8 Claims, 4 Drawing Sheets

(56) References Cited

U.S. PATENT DOCUMENTS

| | | | |
|---|---|---|---|
| 2011/0067503 A1* | 3/2011 | Roudergues | G01L 5/1627 73/862.51 |
| 2012/0166105 A1 | 6/2012 | Biermann et al. | |
| 2012/0234108 A1 | 9/2012 | Janecek et al. | |
| 2014/0273543 A1 | 9/2014 | Hanshew | |
| 2016/0052583 A1* | 2/2016 | Sasaki | G05G 1/30 74/594.4 |
| 2016/0052584 A1 | 2/2016 | Sasaki | |
| 2016/0209281 A1* | 7/2016 | Carrasco Vergara | G01L 3/242 |
| 2017/0358731 A1 | 12/2017 | Fukuda et al. | |
| 2018/0229799 A1* | 8/2018 | Lo | B62M 3/08 |

FOREIGN PATENT DOCUMENTS

| | | | | |
|---|---|---|---|---|
| CN | 207173874 | | 4/2018 | |
| DE | 10007841 | | 9/2001 | |
| DE | 202016000321 | | 4/2016 | |
| DE | 202018005992 | | 3/2019 | |
| EP | 2299252 | | 3/2011 | |
| EP | 2973891 | | 9/2014 | |
| EP | 3299067 | A1 * | 3/2018 | A63B 22/00 |
| EP | 3566937 | | 11/2019 | |
| FR | 2914902 | | 10/2008 | |
| FR | 3078158 | | 8/2019 | |
| FR | 3078158 | A1 * | 8/2019 | B62M 3/08 |
| IT | 2015A000010 | | 1/2015 | |
| JP | 2008221880 | | 9/2008 | |
| WO | 2008/109914 | | 9/2008 | |
| WO | WO 2022034497 | A1 * | 2/2022 | B62M 3/08 |

OTHER PUBLICATIONS

Define relative, Microsoft Bing, Dec. 16, 2022 (Year: 2022).*

International Preliminary Report on Patentability, dated Aug. 23, 2021, in connection with International Application Mo. PCT/IB2020/057583 (13 pages).

International Search Report and Written Opinion of the International Searching Authority, dated Oct. 9, 2020, in connection with International Application No. PCT/IB2020/057583 (12 pages).

Written Opinion of the International Preliminary Examining Authority, dated Jul. 2, 2021, in connection with International Application No. PCT/IB2020/057583 (4 pages).

International Seach Report and Written Opinion of the International Searching Authority, dated Jun. 7, 2021, in connection with International Application No. PCT/IB2021/051912 (14 pages).

International Search Report and Written Opinion issued in connection with International Application No. PCT/B2021/056596 and dated Nov. 8, 2021(16 pages).

International Preliminary Report on Patentability issued in connection with International Application No. PCT/B2021/056596 and dated Jun. 27, 2022 (20 pages).

International Search Report and Written Opinion of the International Searching Authority, dated Nov. 11, 2021, in connection with International Application No. PCT/IB2021/057366 (14 pages).

International Preliminary Report on Patentability, dated Nov. 4, 2022, in connection with International Application No. PCT/IB2021/057366 (6 pages).

* cited by examiner

FIG. 1

PEDAL FOR BICYCLES

CROSS-REFERENCE TO RELATED APPLICATIONS

This patent application claims priority from Italian patent application no. 102019000014676 filed on Aug. 12, 2019, the entire disclosure of which is incorporated herein by reference.

TECHNICAL FIELD

The present invention relates to a pedal for bicycles. In particular, the present invention refers to a pedal for bicycles which is designed to measure the power exerted by a cyclist while pedalling.

STATE OF THE PRIOR ART

The use in bicycles, especially racing/road bicycles, of measurement systems that determine and display a series of parameters/quantities useful for monitoring the physical activity carried out by the cyclist while pedalling, generally the force/power exerted on the pedal and pedalling cadence, is well known.

Electronic measurement systems typically comprise an electronic measurement device which is arranged on the pedal and provided with electronic circuits and boards which measure the aforementioned parameters and transmit the measured parameters in the form of data to a display device generally arranged at the front of the bicycle, which receives the data and shows it to the cyclist.

Some types of electronic measurement devices are fitted on the pedal-pin of the pedal on the side of the pedal-body. An electronic measurement device of this type is for example the one described in Italian patent application no. TV2015A000010 filed by the Applicant.

A technical problem of electronic measurement devices of the aforementioned type is that their presence in the area of the pedal can be inconvenient and cumbersome for the cyclist, as well as exposed to the risk of damage in the event of accidental impacts.

OBJECT OF THE INVENTION

The object of the present invention is therefore to provide a solution for measuring the power exerted by a cyclist while pedalling, which is capable of overcoming the technical problem described above.

This object is achieved by the present invention as it relates to a pedal for bicycles as defined in the appended claims.

BRIEF DESCRIPTION OF THE DRAWINGS

The present invention will now be described with reference to the accompanying drawings, which illustrate a non-limiting embodiment thereof, wherein.

PREFERRED EMBODIMENT OF THE INVENTION

The present invention will now be described in detail with reference to the accompanying drawings in order to allow a skilled person to implement it and use it.

Various modifications to the described embodiments will be readily apparent to those of skill in the art and the general principles described may be applied to other embodiments and applications without however departing from the protective scope of the present invention as defined in the appended claims. Therefore, the present invention should not be regarded as limited to the embodiments described and illustrated herein, but they must be given the broadest protective scope consistent with the principles and features described and claimed herein.

Figure 1:
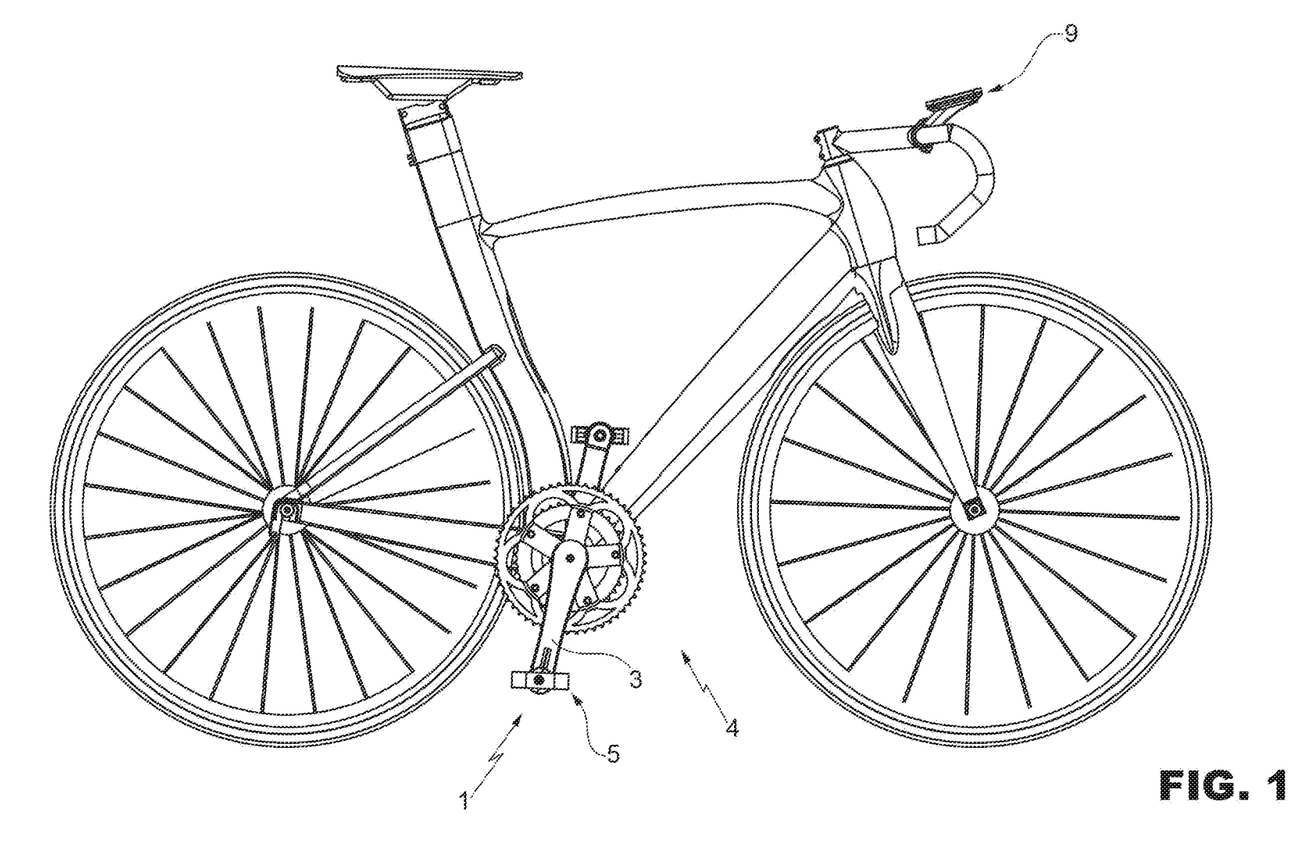
FIG. 1 schematically shows a bicycle equipped with a pedal made according to the teachings of the present invention.
Figures 2, 3:
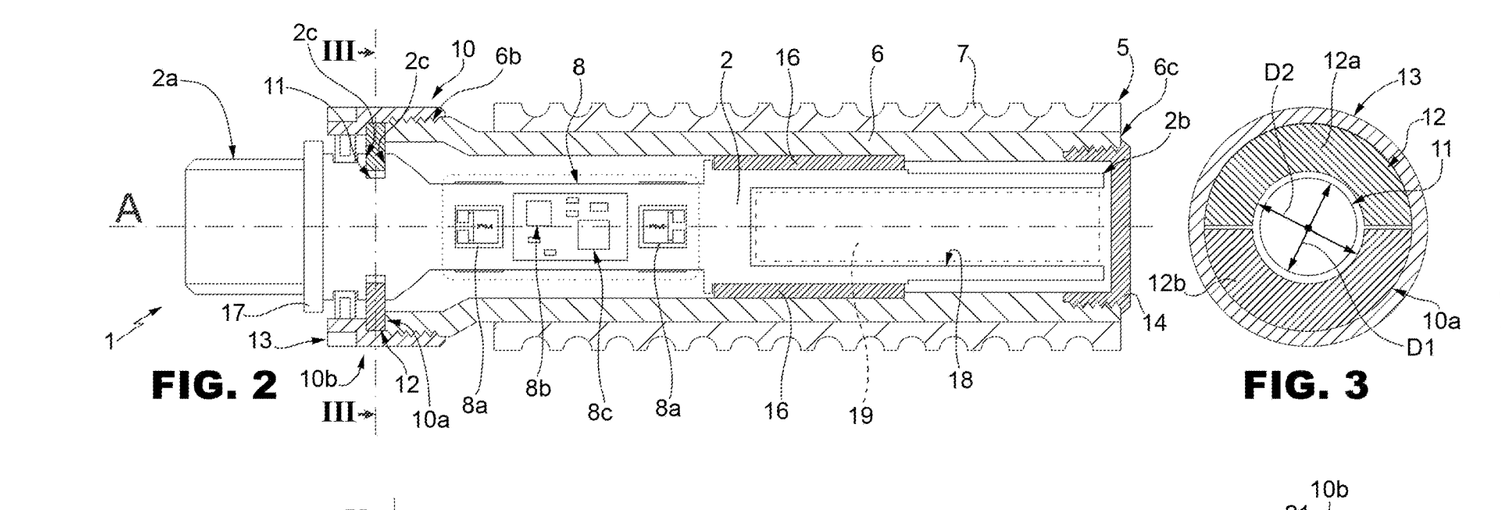
FIG. 2 is a vertical longitudinal schematic section of the pedal shown in FIG. 1.
FIG. 3 is the cross section III-III of the pedal shown in FIG. 2.

With reference to FIGS. 1, 2 and 3, number 1 indicates, as a whole, a pedal for bicycles, which is designed to measure electrical quantities indicative of a cyclist's pedalling. The pedal 1 comprises a pedal-pin 2 which extends along a reference axis A and is structured for being coupled to a pedal crank 3 of a bicycle 4 (FIG. 1).

The pedal-pin 2 may have a first end 2a, which is preferably threaded and is coupled to the corresponding pedal crank 3 of the bicycle 4. The pedal-pin 2 may preferably have an elongated cylindrical shape and extend cantilevered from the pedal crank 3 along the longitudinal reference axis A, preferably approximately orthogonal to the pedal crank 3, and has a second end 2b axially opposite to the end 2a.

According to the example shown in FIGS. 2 and 3, the pedal-pin 2 may comprise an annular crown or flange 17 coaxial with the axis A, which is positioned approximately on the inner side of the threaded portion of the end 2a and designed to be arranged in abutment against the pedal crank 3 when the pedal 1 is connected to said pedal crank 3.

With reference to FIGS. 1 and 2, the pedal 1 also comprises a pedal-body 5, which is coupled in a freely rotatable manner to the pedal-pin 2 so as to be able to rotate around the axis A with respect to the pedal-pin 2. The pedal-body 5 comprises a tubular body, i.e. a hub 6 internally having an opening or hole, preferably a through hole of circular cross-section extending along the axis A. The hub 6 is coupled in a freely rotatable way by means of a bushing 16 to the pedal-pin 2, so as to be able to rotate around the axis A. According to the example shown in FIG. 2a, the bushing 16 is fitted on the pedal-pin 2 approximately in an axially central position.

In the example shown in FIG. 2, the pedal-body 5 further comprises a foot-rest portion 7, which is firmly/rigidly connected to the hub 6, so as to preferably form a one-piece or monolithic body with it, and structured to form a support body for the cyclist's foot. For example, the foot-rest portion 7 can comprise an approximately plate-like structure that extends on a platform approximately parallel to the axis A, on which, in use, the cyclist's foot rests. It should be understood that the shape/structure of the foot-rest portion 7 can be different from the plate-like one mentioned above and/or shown in the attached Figures. It should also be understood that the foot-rest portion 7 may preferably be shaped/structured so as to be connected/hooked to a cyclist's shoe by means of notches/studs (or cleats) of a known type, generally used on the pedals of racing or mountain bikes.

The pedal 1 further comprises an electronic measurement circuit 8, which is firmly coupled to the pedal-pin 2 and configured to provide electrical measurement signals indicative of the deformation of the pedal-pin 2 caused by the force exerted by the cyclist on the pedal-pin 2 during the pedalling. The electronic measurement circuit 8 is configured so as to measure physical quantities indicative of the cyclist's pedalling and output them, i.e. it may communicate them to other electronic devices, in the form of data or signals. According to a preferred embodiment, the electronic measurement circuit 8 is configured to measure a physical quantity corresponding to the mechanical power/force exerted by the cyclist on the pedal 1.

Preferably, the electronic measurement circuit 8 is provided with a plurality of electronic components/devices, some of which may preferably comprise deformation sensors, for example electrical strain gauge circuits 8a, fixed on or in the pedal-pin 2, and designed to measure changes in electrical quantities indicative of mechanical deformations caused by the cyclist on the pedal-pin 2 during pedalling. An electronic component of the electronic measurement circuit 8 may further comprise a processing unit 8b which determines the mechanical power generated by the cyclist and transmitted to the pedal 1 on the basis of the deformation(s), in turn determined as a function of the electrical quantities measured.

A component of the electronic measurement circuit 8 may also preferably comprise a communication module 8c, which is preferably wireless. The communication module 8c may communicate the measured electrical and/or physical quantities, for example the determined deformation and/or power, in the form of data/signals, to a user interface panel 9. Preferably, the interface panel 9 may be designed to be installed on the bicycle 4, preferably at the front (handlebar) (FIG. 1). The user interface panel 9 may be configured to communicate/show pedalling data to the cyclist. It should be understood that the data may vary and depend on the physical quantities measured by the electronic measurement circuit 8.

In the example shown, the electronic components/devices of the electronic measurement circuit 8 are preferably positioned on the external surface of the pedal-pin 2 facing the inner surface of the hub 6. However, it should be understood that the present invention is not limited to the positioning of the electronic components/devices of the electronic measurement circuit 8 on the external surface of the pedal-pin 2, but, additionally and/or alternatively, may provide the positioning of one or more electronic components of the electronic measurement circuit 8 in a position inside the pedal pin 2, for example on the internal tubular wall and/or in recesses/seats formed inside the pedal pin 2.

It should also be understood that the present invention is not limited to the measurement of the physical quantity corresponding to the mechanical power/force exerted by the cyclist on the pedal 1, but, alternatively and/or additionally, may provide the measurement/determination of other physical quantities generally associated with the movement made by the pedal 1 under the thrust of the foot. These physical quantities may comprise, for example, the angular speed/cadence of the pedal 1, the torque, the angular position of the pedal crank 3, the angular acceleration of the pedal 1 and/or the like.

According to the present invention, the pedal 1 further comprises a mechanical clamping member 10 which is structured so as to axially clamp the hub 6 of the pedal-body 5 to the pedal pin-2 in order to prevent the pedal-body 5 from slipping off of the pedal-pin 2 along the axis A.

According to an embodiment shown in FIG. 2, an annular seat 11 coaxial with axis A is obtained on the pedal-pin 2. The annular seat 11 on the inside has a cylindrical bottom wall and two side walls which define two annular shoulders 2c on the pedal-pin 2. According to the embodiment shown in FIG. 2, the annular seat 11, and therefore the respective annular shoulders 2c, are formed on the pedal-pin 2 between the bushing 16 and the flange 17, preferably alongside the latter.

According to the embodiment shown in FIG. 2, the mechanical clamping member 10 comprises two clamping elements 10a and 10b. The clamping element 10a extends radially relative to the pedal-pin 2, i.e. along a direction orthogonal to axis A so as to engage the annular seat 11 and rotate around axis A, and is arranged laterally in abutment against at least one of the two shoulders 2c of the pedal-pin 2.

In the example shown, the clamping element 10a is structured so as to engage the annular seat 11 and be arranged laterally in abutment against the two shoulders 2c of the pedal-pin 2. The shoulders 2c are structured to perform the function of a stop designed to interfere with, that is to block, the axial displacement of the clamping element 10a along the axis A both towards the end 2b and towards the end 2a of the pedal-pin 2.

The clamping element 10b is structured to mechanically couple the hub 6 to the clamping element 10a so that the hub 6 remains axially coupled to the pedal-pin 2 by means of the clamping element 10a, and therefore cannot slip off of the pedal-pin 2.

In the example shown in FIG. 2, the clamping element 10a radially engages the annular seat 11 so as to remain axially trapped in the annular seat 11. The clamping element 10b is structured to radially clamp the clamping element 10a inside the annular seat 11 against the shoulders 2c and cooperates with the latter to prevent the hub 6 from moving along the axis A relative to the pedal-pin 2.

According to a preferable embodiment shown in FIG. 2, the pedal-pin 2 comprises an intermediate cylindrical portion, which extends approximately between the flange 17 and the bushing 16 and has an outer diameter smaller than the inner diameter of an intermediate tubular portion of the hub 6 facing the intermediate cylindrical portion. In the example shown, the inner diameter of the intermediate tubular portion of the hub 6 and the outer diameter of the intermediate cylindrical portion of the pedal-pin 2 are sized so as to define an internal space suitable for housing the electronic measurement circuit 8. Preferably, the electronic measurement circuit 8 is fastened to the external surface of the aforementioned intermediate cylindrical portion of the pedal-pin 2; the aforesaid internal space is conveniently sized so that the electronic measurement circuit 8 does not interfere with the inner wall of the hub 6 during its rotation around the pedal-pin 2.

Preferably, the clamping element 10b may comprise a cylindrical tubular body which is structured to be firmly connected to the axial end 6b of the hub 6 facing the annular flange 17. In the example shown in FIG. 2, the clamping element 10b comprises a substantially cylindrical locking ring nut 13, which has a thread screwed onto a corresponding thread formed on the axial end 6b of the hub 6. The locking ring nut 13 is internally structured to surround the clamping element 10a so as to keep it radially housed in the annular seat 11. The locking ring nut 13 is also structured so that, when connected to the hub 6, it keeps the clamping element 10a in abutment against the shoulders 2c. The clamping element 10a is structured to radially interfere with the locking ring nut 13 so as to block the axial displacement of the locking ring nut 13, hence of the hub 6 connected to it, along the axis A. For this purpose, the locking ring nut 13 may comprise an internal annular step or shoulder which is arranged to rest against a side wall of the clamping element 10a.

With reference to the embodiment shown in FIG. 2, the clamping element 10a comprises an annular body 12 which is arranged in the annular seat 11 so as to be able to rotate therein around the axis A relative to the pedal-pin 2. The annular body 12 is structured to be able to slide within the annular seat 11 so as to rotate freely on the pedal-pin 2 around the reference axis A. The annular body is structured to be preferably arranged in abutment against the shoulders 2c so as to remain axially clamped and not be able to move relative to the pin-pedal 2 along the axis A.

According to a preferred embodiment shown in FIG. 3, the annular body 12 is formed by two distinct and independent semi-cylindrical bodies 12a and 12b having cross sections in the shape of semi-circular segments preferably approximately complementary to each other.

With reference to the embodiment shown in FIG. 2, the locking ring nut 13 radially locks the two semi-cylindrical bodies 12a and 12b in the annular seat 11. The two semi-cylindrical bodies 12a and 12b are structured and sized so as to rest against the shoulders 2c and axially interfere with the locking ring nut 13 so as to block the axial displacement of said locking ring nut 13, hence of the hub 6 connected to it, along the axis A relative to the pin-pedal 2.

The Applicant found out that the two semi-cylindrical bodies 12a and 12b forming the annular body 12 may comprise two half-bushings radially fitted in the annular seat 11 on opposite sides. The semi-cylindrical bodies 12a and 12b may be advantageously made of a material characterised by a reduced friction coefficient. The semi-cylindrical bodies 12a and 12b may be advantageously made of a metallic material, such as bronze or the like, or of a polymer-based material, such as Teflon or the like.

With reference to the embodiment shown in FIG. 2, the bushing 16 is interposed between the pedal-pin 2 and the inner wall of the hub 6. Preferably, the bushing 16 may be fit to the cylindrical portion of the pedal-pin 2 positioned centrally with respect to the foot-rest portion 7. It should be understood that the bushing 16 performs the function of supporting and rotating the hub 6 and may be replaced by any similar support and rotation mechanism of a known type, such as for example a roller bearing or the like.

With reference to the embodiment shown in FIG. 2, the pedal-pin 2 may also preferably have a tubular portion defining an internal compartment or seat 18 which houses an electrical power supply device 19 electrically connected to the electronic measurement circuit 8 so as to power it electrically.

The pedal-pin 2 and the tubular portion may form a monolithic body. In this case the seat 18 is formed on the body of the pedal-pin 2 and extends from the second end 2b, axially extending into the pedal-pin 2. It should be understood that according to a variant, not shown, the tubular portion may be an additional and separate component, which is coupled, for example screwed, to one end of the pedal-pin 2 so as to define an extension along the axis A inside the hub 6.

The seat 18 is preferably cylindrical, preferably has a circular section transverse to axis A, and has an access opening/mouth. Preferably, the electrical power supply device 19 comprises a battery, for example a rechargeable battery, having a shape complementary to the seat 18. Preferably, the seat 18 is sized so as to allow the battery to be inserted therein through the corresponding access opening. Preferably, the electrical connection between the electrical power supply device 19 and the electronic measurement circuit 18 can comprise electrical wires arranged in the pedal-pin 2, for example in a through duct (not shown) formed therein.

Preferably, the end 6c of the hub 6 may be closed by a cap or cover 14 shaped so as to also close the access opening of the seat 18. Preferably, the cover 14 can be coupled, in a firm yet easily removable/separable manner, to the end 6c of the hub 6 and is designed to protect the electrical power supply device 19.

In use, the assembly of the pedal 1 may comprise the steps of: firmly arranging/fastening the electronic measurement circuit 8 onto/to the pedal-pin 2, arranging the electrical power supply device 19 into the seat 18 and connecting it to the electronic measurement circuit 8, fitting the bushing 16 into the pedal-pin 2, axially fitting the hub 6 of the pedal-body 5 onto the pedal-pin 2, radially engaging the two semi-cylindrical bodies 12a and 12b into the annular seat 11 from opposite radial directions approximately orthogonal to axis A, fitting the locking ring nut 13 by engaging it onto the end 2a of the pedal-pin 2 in the area of the flange 17, screwing the locking ring nut 13 onto the end 6b of the hub 6 so as to axially tighten the pedal-body 5 like a packet against the semi-cylindrical bodies 12a and 12b, so that, on the one hand, the hub 6 is axially clamped, and on the other hand, the two semi-cylindrical bodies 12a and 12b are radially trapped in the annular seat 11, while free to slide within the annular seat 11 around axis A, and closing the open end 6c of the hub 6 with the cover 14.

In use, the hub 6 can rotate around axis A relative to the pedal-pin 2 thanks to the presence of the bushing 16 and the semi-cylindrical bodies 12a and 12b rotating in the annular seat 11. The semi-cylindrical bodies 12a and 12b rest against the shoulders 2c of the pedal-pin 2 and axially hold the locking ring nut 13 which, in turn, is screwed to the hub 6, thereby preventing the latter from axially slipping off of the pedal-pin 2.

In the embodiment shown in FIG. 2 it should be noted that, in use, the force applied by the cyclist on the pedal only stresses the pedal-pin 2 through the bushing 16 which performs the function of supporting the hub 6, whereas the two semi-cylindrical bodies 12a and 12b do not have the function of supporting the hub 6, only the function of axially clamping the same.

For this purpose, as shown in FIG. 3, the diameter D1 of the cylindrical bottom wall of the annular seat 11 is smaller than the diameter D2 of the inner semi-circular wall of the two semi-cylindrical bodies 12a and 12b. The technical effect obtained with the aforementioned dimensional ratio of the diameters is that the semi-cylindrical bodies 12a and 12b, in use, remain slightly spaced from the bottom wall of the annular seat 11, i.e. they are not arranged in abutment against it and therefore do not cause deformations on the pedal-pin 2 which could affect the correctness of the measurement when the thrust force of the cyclist is applied on the pedal-body 5 in an area off-centre with respect to the support bushing 16.

The pedal locking member described above is extremely advantageous as it makes it possible to:
 free space inside the hub of the pedal-body so that both the electronic measurement circuit and the battery can be installed therein,
 use the hub of the pedal-body as an external protective casing for both the electronic measurement circuit and the battery,
 eliminate the encumbrance of the electronic circuits and/ or the battery outside the pedal-body.

Lastly, it is clear that the pedal described and illustrated above can be subject to modifications and variations without however departing from the scope of the present invention, as defined in the appended claims.

Figures 4, 5:
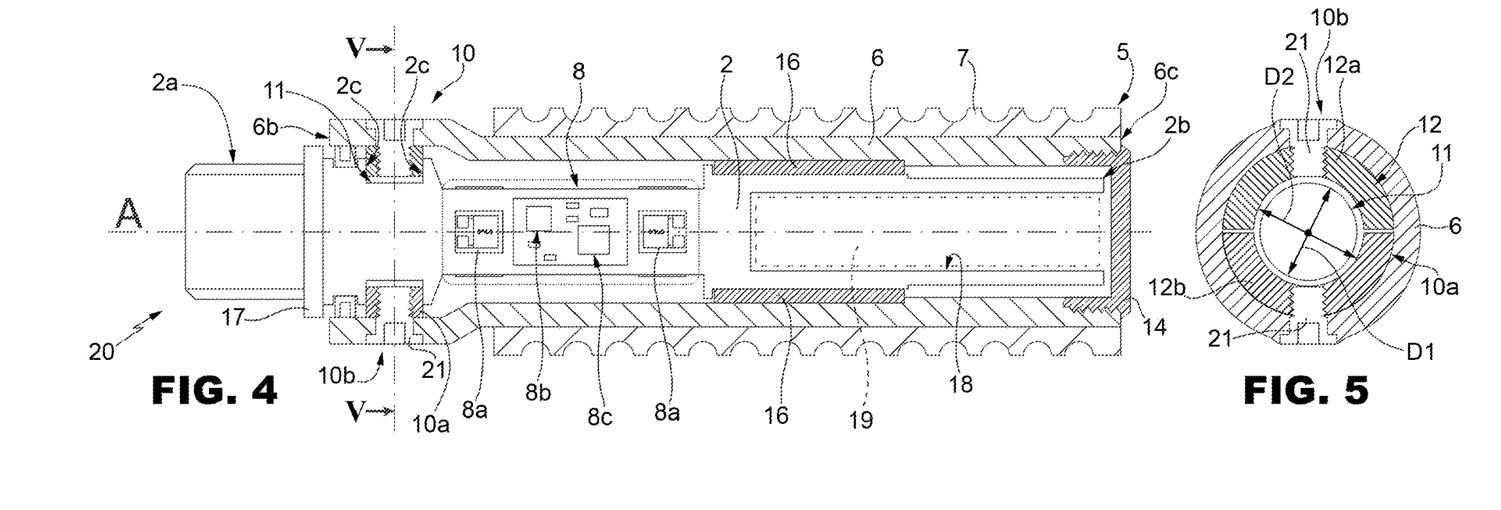
FIG. 4 is a vertical longitudinal schematic section of the pedal shown in FIG. 1 according to a first variant embodiment.
FIG. 5 is the cross section V-V of the pedal shown in FIG. 4.

The embodiment shown in FIGS. 4 and 5 relates to a pedal 20, which is similar to pedal 1 (shown in FIG. 2), and whose component parts will be identified, where possible, with the same reference numbers that identify corresponding parts of pedal 1.

Pedal 20 differs from pedal 1 in that the clamping element 10a is radially fastened in a firm and rigid manner to the hub 6 through the clamping element 10b. As shown in FIGS. 4 and 5, the pedal 20 is devoid of the locking ring nut 13, and the clamping element 10b of the clamping member 10 comprises two diametrically opposite screws 21, each of which radially passes through the hub 6, preferably through a respective hole orthogonal to axis A and formed in the hub 6, the threaded end of the screws 21 protruding from the hole being firmly screwed on the clamping element 10a in the annular seat 11.

As shown in FIGS. 4 and 5, the threaded ends of the two screws 21 protruding from the respective holes in the hub 6 are screwed on respective threaded holes radially formed in the two semi-cylindrical bodies 12a and 12b. Conveniently, the two screws 21 can be Allen screws.

The hub 6 is therefore radially connected to the two semi-cylindrical bodies 12a and 12b by means of the screws and rotates with the same around the axis A, while remaining axially clamped by the shoulders 2c corresponding to the side walls of the annular seat 11 of the pedal-pin 2, which prevent the two semi-cylindrical bodies 12a and 12b, hence the hub 6, from moving along the axis A.

It should be understood that the clamping element 10a of the clamping member 10 of the pedal 20 shown in FIGS. 4 and 5 can comprise at least one, or alternatively two semi-cylindrical bodies 12a and 12b in the annular seat 11, and at least one, or alternatively two screws 21 to connect one or, respectively, both the semi-cylindrical bodies 12a and 12b to the hub 6.

In use, the assembly of the pedal 20 can comprise the steps of: firmly arranging/fastening the electronic measurement circuit 8 onto/to the pedal-pin 2, arranging the electrical power supply device 19 into the seat 18 and connecting it to the electronic measurement circuit 8, fitting the bushing 16 into the pedal-pin 2, radially engaging the two semi-cylindrical bodies 12a and 12b into the annular seat 11 from opposite radial directions approximately orthogonal to axis A, axially fitting the hub 6 of the pedal-body 5 onto the pedal-pin 2 so as to align the holes of the hub with the threaded holes formed in the two semi-cylindrical bodies 12a and 12b, engaging the screws 21 in the holes of the hub 6 and screwing them into the threaded holes of the two semi-cylindrical bodies 12a and 12b, so as to fasten the semi-cylindrical bodies 12a and 12b to the hub 6 of the pedal-body 5.

Figures 6, 7:
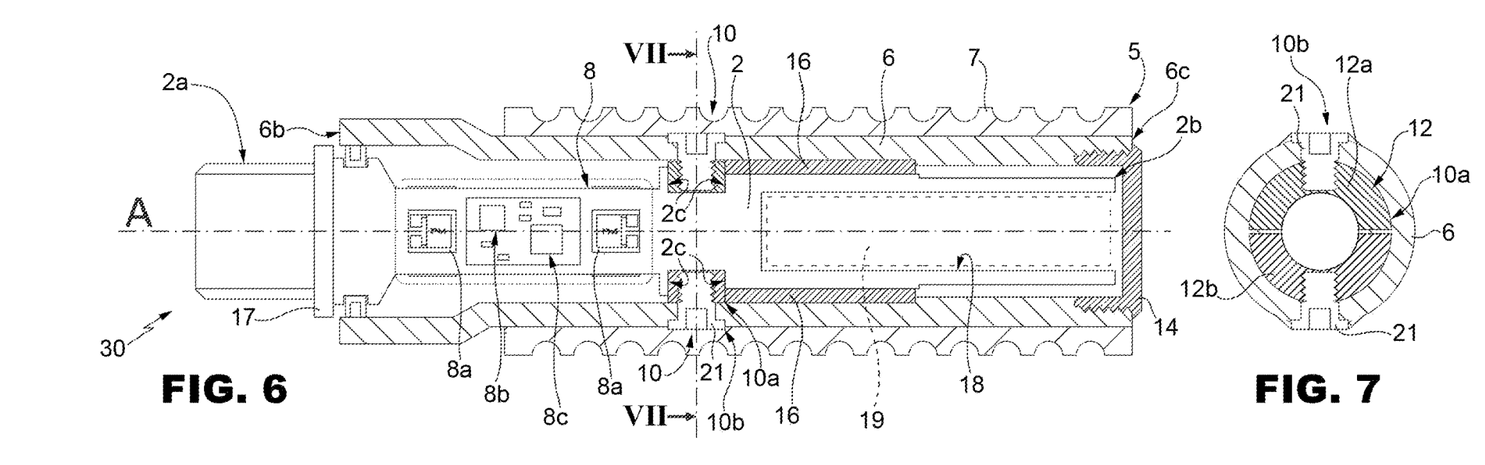
FIG. 6 is a vertical longitudinal schematic section of the pedal shown in FIG. 1 according to a second variant embodiment.
FIG. 7 is the cross section VII-VII of the pedal shown in FIG. 6.

The embodiment shown in FIGS. 6 and 7 relates to a pedal 30, which is similar to pedal 20 shown in FIGS. 4 and 5, and whose component parts will be identified, where possible, with the same reference numbers that identify corresponding parts of pedal 20. Pedal 30 differs from pedal 20 in that the anchoring member 10, instead of being arranged near the flange 17, is arranged approximately in an intermediate axial position of the hub 6, preferably approximately central and adjacent to the bushing 16.

Figures 8, 9:
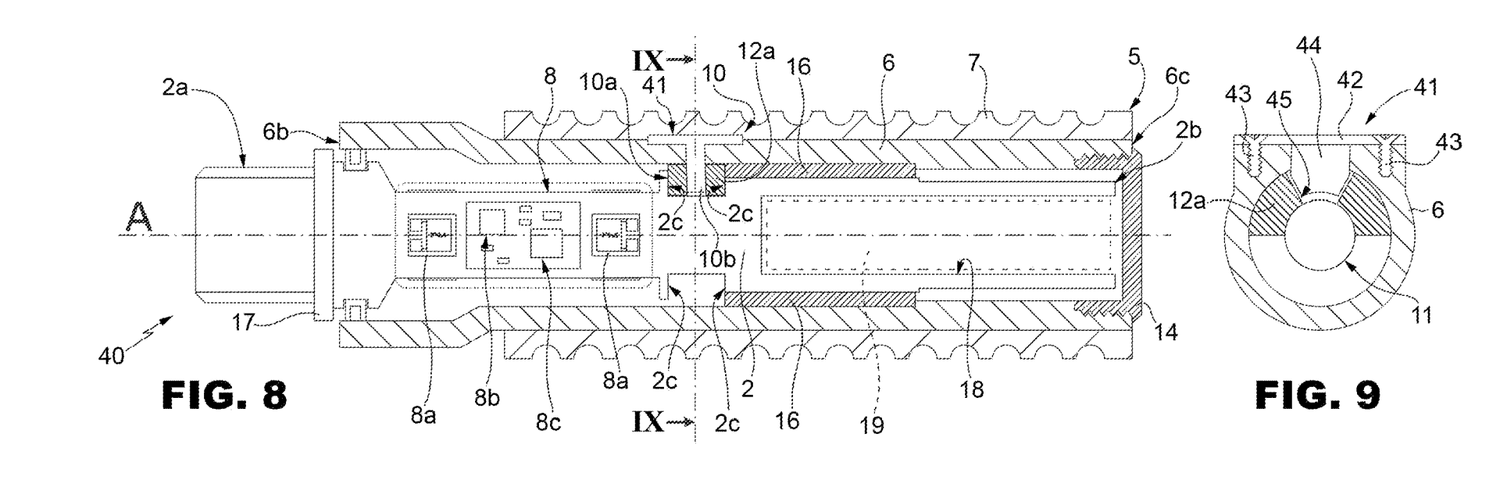
FIG. 8 is a vertical longitudinal schematic section of the pedal shown in FIG. 1 according to a third variant embodiment.
FIG. 9 is the cross section IX-IX of the pedal shown in FIG. 8.

The embodiment shown in FIGS. 8 and 9 relates to a pedal 40, which is similar to pedal 30 shown in FIGS. 6 and 7, and whose component parts will be identified, where possible, with the same reference numbers that identify corresponding parts of pedal 30.

Pedal 40 differs from pedal 30 in that the screw 21 of the clamping element 10b of the mechanical clamping member is replaced by a fastening device 41, which has an external head 42 firmly fastened to the hub 6, preferably on the external surface thereof, preferably by means of fastening means 43, for example screws, and a rod 44 which protrudes from the head 42 and engages an opening 45, for example a cavity formed in a semi-cylindrical body 12a defining the clamping element 10a. Preferably, the section of the rod 44 which is transverse to axis A can have an approximately trapezoidal shape (FIG. 9), and the section of the rod 44 which is longitudinal along axis A (FIG. 8) can be thin, with an approximately plate-like or laminar shape. The opening 45 of the semi-cylindrical body 12a preferably has a shape that is approximately complementary to the rod 44, so that it can house it. It should be understood that, in the pedal 40, the rod 44 can directly act as an axial interference in the annular seat 11 against the shoulders 2c, thus replacing the semi-cylindrical body 12a which, as a result, can be conveniently eliminated, while the head 42 of the clamping element 41 firmly coupled to the hub 6 can perform the function of the clamping element 10b as it firmly/rigidly connects the rod 44 to the hub 6.

Figure 10:
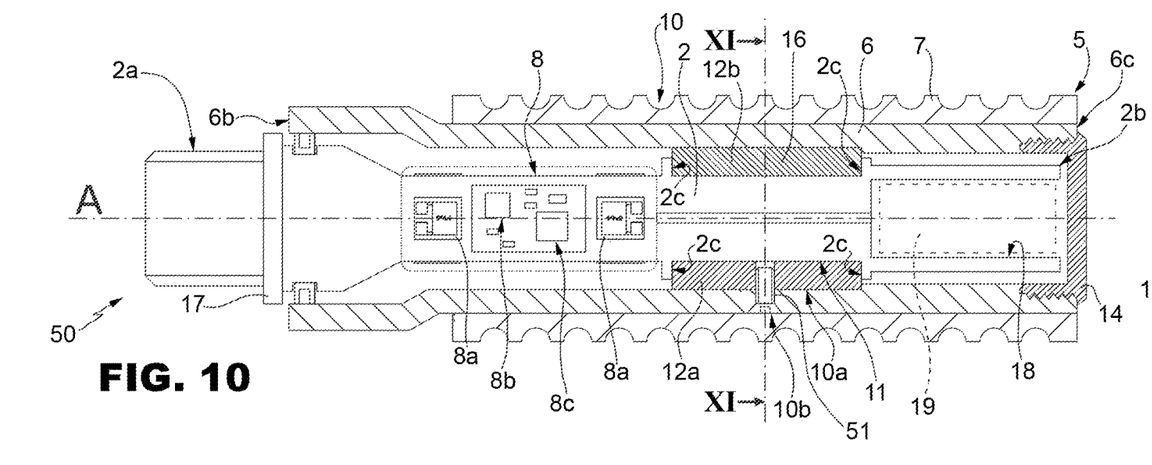
FIG. 10 is a vertical longitudinal schematic section of the pedal shown in FIG. 1 according to a fourth variant embodiment.
Figure 11:
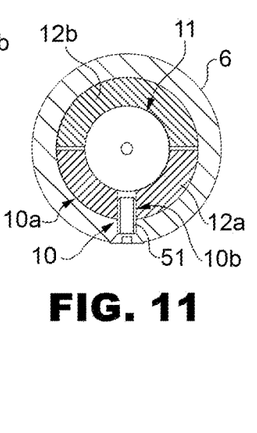
FIG. 11 is the cross section XI-XI of the pedal shown in FIG. 10.

The embodiment shown in FIGS. 10 and 11 relates to a pedal 50, which is similar to pedal 30 shown in FIGS. 6 and 7, and whose component parts will be identified, where possible, with the same reference numbers that identify corresponding parts of pedal 30. Pedal 50 differs from pedal 30 in that the bushing 16 is formed by the two semi-cylindrical bodies 12a and 12b which make up the clamping element 10a and are radially fitted in the annular seat 11 obtained centrally on the pedal-pin 2 against the shoulders 2c. The clamping element 10b comprises one or two screws 51 radially connecting an intermediate portion of the hub 6 to one or two, respectively, semi-cylindrical bodies 12b or 12a.

Figure 12:
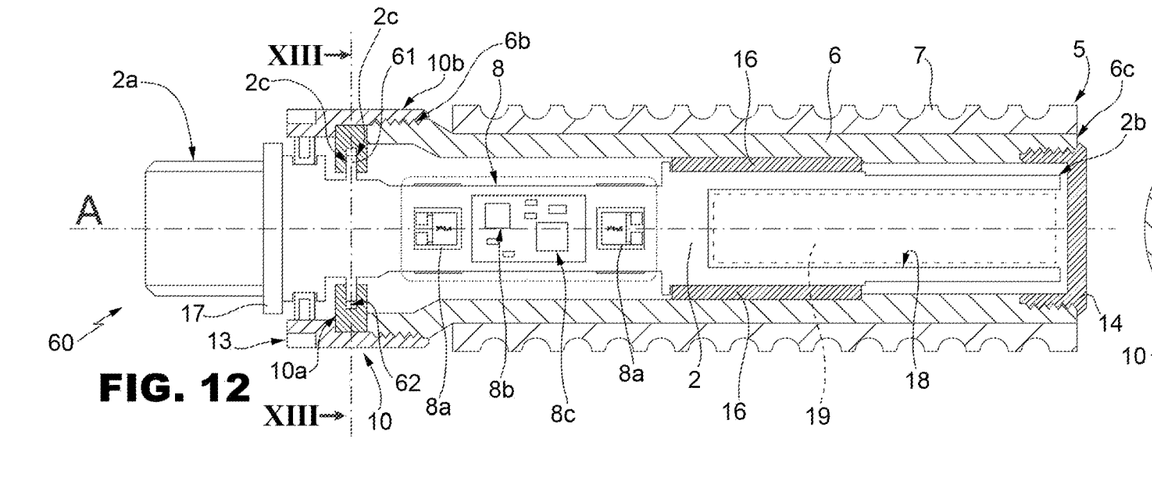
FIG. 12 is a vertical longitudinal schematic section of the pedal shown in FIG. 1 according to a fifth variant embodiment.
Figure 13:
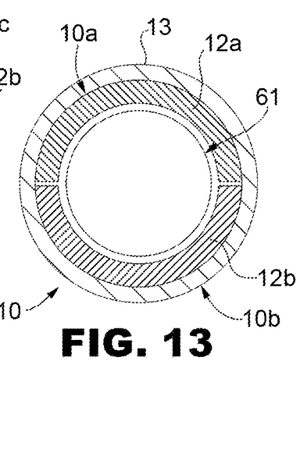
FIG. 13 is the cross section XIII-XIII of the pedal shown in FIG. 12.

The embodiment shown in FIGS. 12 and 13 relates to a pedal 60, which is similar to pedal 1 shown in FIG. 2, and whose component parts will be identified, where possible, with the same reference numbers that identify corresponding parts of pedal 1. Pedal 60 differs from pedal in that the annular shoulder 2c, against which the clamping element 10a abuts, is formed by a lateral side of an annular flange or projection 61 on the pedal-pin 2. In the embodiment shown in FIGS. 12 and 13, the annular projection 61 is coaxial with axis A, is arranged at the flange 17 and radially engages a seat 62 formed on the inner cylindrical wall of the clamping element 10a. In the embodiment shown in FIGS. 12 and 13, the clamping element 10a comprises two half-bushings, the seat 62 corresponds to an annular seat formed on the inner circular walls of the two half-bushings, and the annular projection 61 radially engages the annular seat 62 so that, through the clamping element 10b, the hub 6 is prevented from moving along the axis A.

It should be pointed out that the clamping element 10a is arranged in abutment against at least one shoulder 2c defined by a lateral side of the annular projection 61 facing the flange 17. In the example shown, the two half-bushings are coupled to the annular projection 61 through the seat 62 in a freely rotatable manner around the axis A. The seat 62 of the two half-bushings is structured so as to have the inner side walls in abutment against the shoulders 2c defined by the two opposite lateral sides of the annular projection 61, so as to axially clamp the half-bushings to the annular projection 61 along the axis A. The locking ring nut 13 in the pedal 60 is structured to keep the half-bushings radially engaged against the annular projection 61 and to connect the hub 6 to the half-bushings.

The invention claimed is:

1. A pedal for bicycles comprising:
   a pedal-pin which extends along a reference axis and has a first axial end structured for being coupled to a pedal crank of a bicycle,
   a pedal-body that comprises a hub coupled in a freely rotatable manner on said pedal-pin so as to rotate around said reference axis,
   electronic measurement means, which are firmly coupled to the pedal-pin and configured to provide electrical measurement signals indicative of the deformation of the pedal-pin caused by the force exerted by the cyclist on the pedal-pin during the pedaling,
   a mechanical clamping member which is structured so as to axially clamp said hub of the pedal-body to said pedal-pin,
   characterised in that:
   said pedal-pin has two annular shoulders coaxial with the reference axis; on said pedal-pin an annular seat is obtained, coaxial with said axis, said annular seat has two inner side walls each forming a corresponding annular shoulder of said pedal-pin,
   said mechanical clamping member comprises:
   a first clamping element which is arranged on said pedal-pin to rotate around the reference axis and is positioned in abutment against at least on of said shoulder in order to be axially clamped along said axis,
   said first clamping element is arranged in said annular seat such as to slide in the same, thus being able to freely rotate on the pedal-pin around the reference axis and remains axially trapped in the annular seat in abutment against at least one of said annular shoulders,
   and a second clamping element that firmly couples said hub to said first clamping element so that said hub is axially clamped onto the pedal-pin.

2. The pedal according to the claim 1, wherein said first clamping element comprises at least one semi-cylindrical body; said second clamping element comprises fastening means, structured to fasten said hub to at least one of the semi-cylindrical bodies.

3. The pedal according to claim 2, wherein a radial opening is obtained on said semi-cylindrical body; said fastening means comprise a rod that radially passes through said hub and protrudes from the same to radially engage said opening of said semi-cylindrical body.

4. The pedal according to claim 1, wherein said second clamping element comprises a locking ring nut which is arranged on said pedal-pin next to at least one said shoulder, is connected to a first end of the hub, and is radially coupled to said first clamping element so as to keep it in abutment against at least one said shoulder of the pedal-pin.

5. The pedal according to claim 1, comprising a support and rotation bushing which is interposed between an approximately central portion of said pedal-pin and said hub.

6. The pedal according to claim 5, wherein said shoulders is obtained on a portion of said pedal-pin comprised between said first end of said pedal-pin and said rotation bushing.

7. The pedal according to claim 1, wherein said electronic measurement means are arranged on an intermediate portion of said pedal-pin which is positioned inside said hub and is sized so that said electronic measurement means do not interfere with said hub during its rotation.

8. The pedal according to claim 1, wherein said pedal-pin comprises, or is coupled to, a tubular portion which extends inside said hub and is internally provided with a seat which extends coaxial with the axis and is designed to house electrical power-supply means electrically connected to said electronic measurement means for powering the same.

\* \* \* \* \*